United States Patent
Vemuri et al.

(10) Patent No.: US 6,976,022 B2
(45) Date of Patent: Dec. 13, 2005

(54) METHOD AND MECHANISM FOR BATCH PROCESSING TRANSACTION LOGGING RECORDS

(75) Inventors: Srinivas Vemuri, Sunnyvale, CA (US); Amit Ganesh, San Jose, CA (US); Arvind Nithrakashyap, San Mateo, CA (US); Roger Bamford, Woodside, CA (US); Jonathan Klein, Redwood City, CA (US); Vikram Joshi, Los Gatos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 365 days.

(21) Appl. No.: 10/245,118

(22) Filed: Sep. 16, 2002

(65) Prior Publication Data

US 2004/0054643 A1 Mar. 18, 2004

(51) Int. Cl.⁷ ............................................... G06F 17/30
(52) U.S. Cl. ........................................................... 707/8
(58) Field of Search ............................. 707/200, 201, 707/202, 203, 204, 205, 206, 1, 8

(56) References Cited

U.S. PATENT DOCUMENTS

| | | |
|---|---|---|
| 5,452,445 A | 9/1995 | Hallmark et al. |
| 5,485,608 A | 1/1996 | Lomet et al. |
| 5,499,367 A | 3/1996 | Bamford et al. |
| 5,524,205 A | 6/1996 | Lomet et al. |
| 5,737,601 A | 4/1998 | Jain et al. |
| 5,806,075 A | 9/1998 | Jain et al. |
| 5,832,516 A * | 11/1998 | Bamford et al. ............ 707/202 |
| 5,845,292 A * | 12/1998 | Bohannon et al. ......... 707/202 |
| 5,850,507 A | 12/1998 | Ngai et al. |
| 5,864,849 A * | 1/1999 | Bohannon et al. ............ 707/8 |
| 5,870,758 A | 2/1999 | Bamford et al. |
| 5,870,759 A | 2/1999 | Bauer et al. |
| 5,870,765 A | 2/1999 | Bauer et al. |
| 5,884,325 A | 3/1999 | Bauer et al. |
| 5,903,898 A * | 5/1999 | Cohen et al. ............... 707/204 |
| 5,926,816 A | 7/1999 | Bauer et al. |
| 5,933,593 A | 8/1999 | Arun et al. |
| 5,937,414 A | 8/1999 | Souder et al. |
| 5,946,700 A | 8/1999 | Pongracz et al. |
| 5,956,704 A | 9/1999 | Gautam et al. |
| 5,963,959 A | 10/1999 | Sun et al. |
| 5,963,960 A | 10/1999 | Swart et al. |
| 5,974,425 A | 10/1999 | Obermarck et al. |
| 5,991,772 A | 11/1999 | Doherty et al. |
| 5,996,088 A | 11/1999 | Frank et al. |
| 6,026,406 A | 2/2000 | Huang et al. |
| 6,041,423 A | 3/2000 | Tsukerman |
| 6,055,546 A | 4/2000 | Pongracz et al. |
| 6,144,983 A | 11/2000 | Klots et al. |
| 6,182,086 B1 * | 1/2001 | Lomet et al. ............... 707/202 |
| 6,182,241 B1 | 1/2001 | Ngai et al. |
| 6,185,577 B1 | 2/2001 | Nainani et al. |
| 6,199,110 B1 | 3/2001 | Rizvi et al. |
| 6,253,212 B1 | 6/2001 | Loaiza et al. |
| 6,289,335 B1 | 9/2001 | Downing et al. |
| 6,292,808 B1 | 9/2001 | Obermarck et al. |
| 6,295,610 B1 | 9/2001 | Ganesh et al. |

(Continued)

OTHER PUBLICATIONS

Brajendra Panda et al, Data dependency based on logging for defensive information warfare, 2000, ACM Press, N, NY, vol. 1 (Proc. of 2000 ACM symposium on Applied computing), pp. 361–365.*

Gerhard Weikum et al., Multi–level Recovery, 1990, ACM Press, NY, NY, pp. 109–123.*

*Primary Examiner*—Diane D. Mizrahi
(74) *Attorney, Agent, or Firm*—Bingham McCutchen LLP

(57) ABSTRACT

A method and mechanism is disclosed for implementing transaction logging in a database system. In-memory undo records are maintained to log undo information for the database system. Redo records are batch processed, with multiple redo records for a transaction stored on disk at commit time.

49 Claims, 6 Drawing Sheets

U.S. PATENT DOCUMENTS

| | | | |
|---|---|---|---|
| 6,351,754 B1 * | 2/2002 | Bridge, Jr. et al. | |
| 6,353,828 B1 * | 3/2002 | Ganesh et al. | |
| 6,363,403 B1 * | 3/2002 | Roy et al. | 707/206 |
| 6,487,552 B1 * | 11/2002 | Lei et al. | |
| 6,490,610 B1 * | 12/2002 | Rizvi et al. | |
| 6,493,726 B1 * | 12/2002 | Ganesh et al. | |
| 6,510,421 B1 * | 1/2003 | Ganesh et al. | |
| 6,574,717 B1 * | 6/2003 | Ngai et al. | |
| 6,615,220 B1 * | 9/2003 | Austin et al. | |
| 6,618,822 B1 * | 9/2003 | Loaiza et al. | |
| 6,631,371 B1 * | 10/2003 | Lei et al. | |
| 6,631,374 B1 * | 10/2003 | Klein et al. | |
| 6,647,510 B1 * | 11/2003 | Ganesh et al. | |
| 6,678,704 B1 * | 1/2004 | Bridge, Jr. et al. | |
| 6,684,223 B1 * | 1/2004 | Ganesh et al. | |
| 6,728,747 B1 * | 4/2004 | Jenkins et al. | |
| 6,738,971 B2 * | 5/2004 | Chandrasekaran et al. | |
| 6,823,347 B2 * | 11/2004 | Chandrasekaran | |
| 6,832,229 B2 * | 12/2004 | Reed | |

* cited by examiner

METHOD AND MECHANISM FOR BATCH PROCESSING TRANSACTION LOGGING RECORDS

BACKGROUND AND SUMMARY

The invention relates to computer systems, and more particularly to a method and mechanism for implementing transaction logging in a database system.

In database systems, a "transaction" normally refers to an atomic set of operations performed against a database. The transaction may access, create, modify, or delete database data or database metadata while it is being processed. A "commit" occurs when the transaction has completed its processing and any changes to the database by the transaction are ready to be permanently implemented in the database system. Because the transaction is atomic, all actions taken by the transaction must be committed at the same time. If any operation taken by the transaction cannot be performed, then the entire transaction must be aborted—not just the particular operation that failed. When the transaction is aborted, any changes made by that transaction to the database are "rolled back" such that the database is returned to its pre-existing state from immediately prior to the aborted transaction.

Transaction log records can be maintained to allow suitable recovery operations in the event of a system failure or aborted transaction. Some common problems that could cause a system failure or aborted transaction include hardware failure, network failure, process failure, database instance failure, data access conflicts, user errors, and statement failures in the database access programs (most often written in the structured query language or SQL).

Different types of transaction log records can be maintained in a database system. A common transaction logging strategy is to maintain "redo" records that log all changes made to the database. With "write ahead logging", each change to data is first recorded in the redo log, and only afterwards is that change actually made to the database block corresponding to the changed data. This protects against the situation when a system failure occurs and the version of the database data that is immediately restored from disk does not accurately reflect the most recent state of the database. This may occur because of changes to the data that has only occurred in cache, and have not been recorded to disk before the failure. If redo log have been properly maintained for these cache-only changes, then recovery can be performed by applying the redo records to roll the database forward until it is consistent with the state that existed just before the system failure.

Another type of log record that may be maintained is the "undo" record, which can also be referred to as "rollback" segments. Undo records contain information about database actions that should be undone during certain database operations. For example, if the rolling forward process during recovery has applied uncommitted changes to the database, then undo records can be applied to remove uncommitted changes, thereby ensuring that only committed changes exist in the database after recovery. In addition, if a transaction is aborted, then undo records can be applied to return the database to its pre-existing state from prior to the aborted transaction. If a database uses multi-versioning to allow different transactions to view database data from different points in time, then undo records can be used to create multiple versions of the database that are consistent with the different points in time. A general approach for implementing undo and redo records is disclosed in co-pending U.S. application Ser. No. 09/748,408, entitled, filed Dec. 22, 2000, which is hereby incorporated by reference in its entirety.

In conventional database systems, a significant amount of overhead may be incurred to create and maintain transaction logs. The actions of persistently writing and storing redo and undo logs to disk requires I/O operations that may cause excessive delays and latencies in the system.

The present invention provides improved methods and systems for implementing transaction logging in a database system. In one embodiment, in-memory undo records are maintained to log undo information for the database system. In an alternate embodiment, redo records are batch processed, with multiple redo records for a transaction stored on disk at commit time. Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention. The same or similar elements in the figures may be referenced using the same reference numbers.

DETAILED DESCRIPTION

The present invention provides a method and mechanism for implementing transaction logs in a database system. For the purpose of explanation, throughout this document the term "disk" or "disk system" is used to refer to data storage systems, but the inventive concepts disclosed herein may also be applied to other types of storage systems besides disk-based systems. In addition, the following description will be made with respect to the storage/retrieval of relational data from a database. It is noted, however, that the present invention is applicable to managing other types and granularities of data in a computing system, and thus is not to be limited to compression of just relational data.

In many database systems, logical space is allocated to store data in a database. The logical space can be mapped onto physical disks or other storage systems. A common unit of allocation is the database block, which is the finest level of granularity for allocating and accessing data from disks and datafiles in many database systems. The block size may or may not correspond to physical block sizes on disk or operating system block sizes. In many database systems, the block size is a configurable parameter that can be tuned for performance advantages. The following explanation is made with reference to storing data in database blocks, although the invention is also applicable to other storage granularities in a database system.

In-Memory Undo

An embodiment of the present invention provides an improved method and system for implementing undo records that are stored in memory. In the present embodiment, rather than extensively writing and persisting undo records onto disk, undo records are maintained in memory. One advantage of this approach is that by storing undo information in memory, transaction logging overhead is decreased since fewer I/O operations will need to be performed to maintain undo records in the system.

Figure 1:
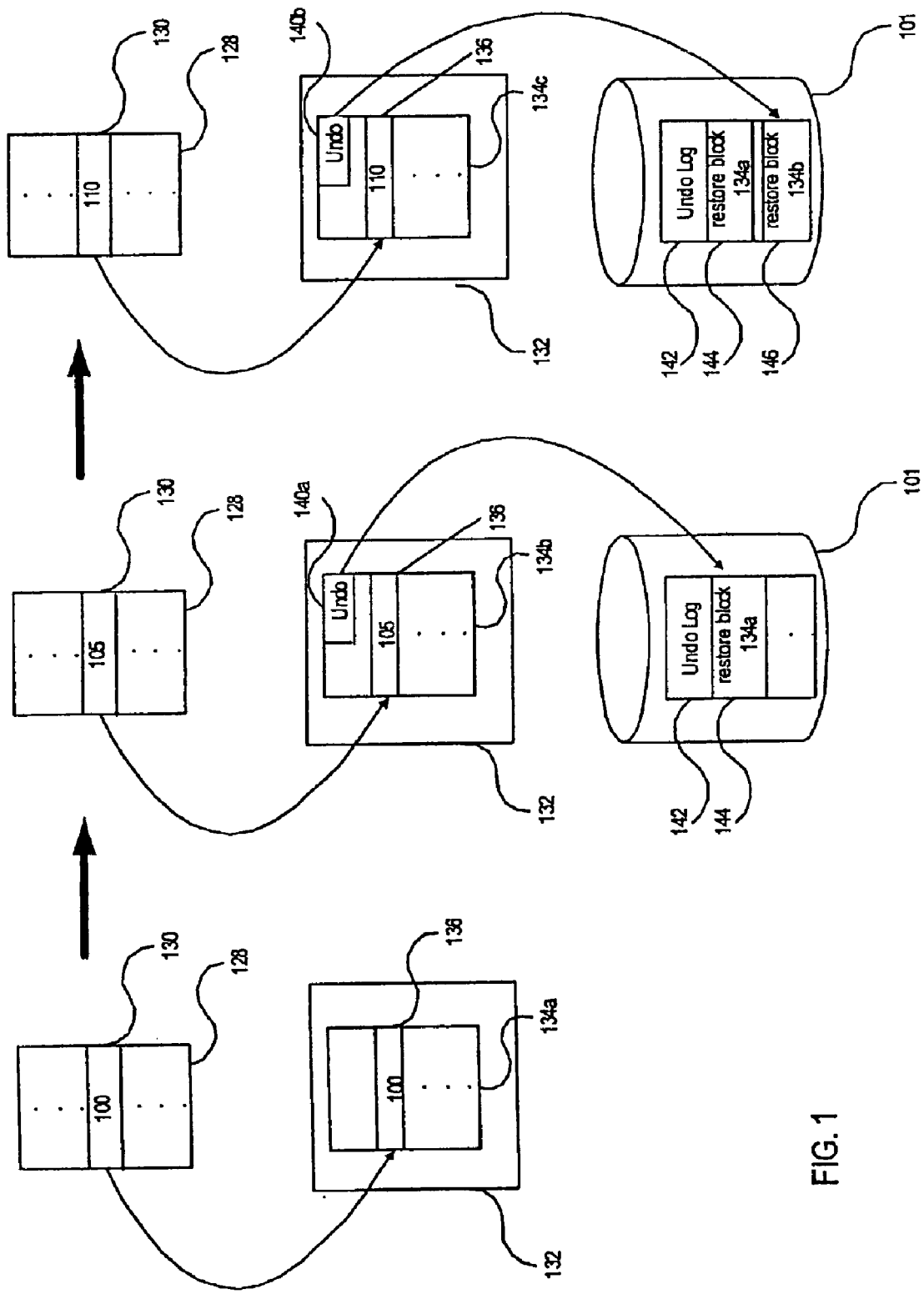
FIG. 1 shows a structure for implementing undo records.

Before describing in-memory undo information, it is helpful to first describe an alternate approach in which undo records are stored on disk. FIG. 1 illustrates an example process for implementing undo records that are stored on disk. Shown in FIG. 1 is a database table 128 that has the value "100" in row 130. A database block 134a is maintained to store the data value in row 130. In particular, portion 136 of database block 134a is allocated to store the value "100" for row 130. Database block 134a could be maintained in a memory cache 132, or persistently stored on a disk drive.

Consider if the value in row 130 is changed from "100" to "105" (shown in the middle portion of FIG. 1). When the database system implements this change to row 130 in table 128, it is actually making this modification to the storage structure that corresponds to this row, i.e., the database block for this row/table. Thus, database block version 134a is modified into database block version 134b, with portion 136 now holding the data value "105".

As noted above, undo records are maintained to allow the system to roll back changes to the database. Here, an undo record 144 is created to store change vectors that allow the system to roll back the changes associated with changing the value in row 130 from 100 to 105. In an embodiment, the database block itself is modified to include or be associated with a reference structure 140a that references, points or links to the corresponding undo record 144. The undo record 144 is stored in an undo log 142 that is maintained on disk 101. Applying the undo record 144 to roll back the above changes will essentially reverse the changes shown in block 134b to the prior version shown in block 134a.

Similar results occur if another update is performed to change the data value in row 130 from "105" to "110" (shown in far-right portion of FIG. 1). Thus, the present state of the block as shown in database block 134b is modified as shown in database block 134c, with portion 136 now holding the data value "110".

A new undo record 146 is created to store change vectors that allow the system to roll back the changes associated with changing the value in row 130 from 105 to 110. In this embodiment, the database block itself is modified to include a reference structure 140b that references, points or links to the corresponding undo record 146. The undo record 146 is also stored in an undo log 142 that is maintained on disk 101. Applying the undo record 146 to roll back the above changes will essentially reverse the changes shown in block 134c to the prior version shown in block 134b. Thus, undo record 146 includes a change vector directed to changing the value in portion 136 between the "110" value and the "105" value. In addition, undo record 146 includes a change vector directed to changing the block from including or being associated with an undo referencing structure that points to undo record 146 (i.e., structure 140b) to one that points to undo record 144 (i.e., structure 140a).

If these changes are to be rolled back, then the latest undo record 146 is applied first. Applying undo record 146 will change the state of the block associated with row 130 from 134c to 134b. In particular, the data value in portion 136 of the block will change from "110" to "105". In addition, the undo referencing structure in the block will change from pointing to undo record 146 to pointing to undo record 144. Once the state in block 134b is restored, undo block 144 can be applied to restore the state of the block associated with row 130 from 134b to 134a. In particular, the data value in portion 136 of the block will change from "105" to "100". In addition, the undo referencing structure in the block will change from pointing to undo record 144 to its original state in block 134a. In this manner, it can be seen that a chain of undo records is created that points to each prior undo record, since each earlier version of the database block that is restored references the next-earlier undo record that can be applied to restore the next-earlier version of the database block.

It is noted, however, that if the undo records are stored on disk 101, costly I/O operations are performed both when writing the records to disk and during recovery operations when the undo records are accessed to roll back the database block.

Figure 2:
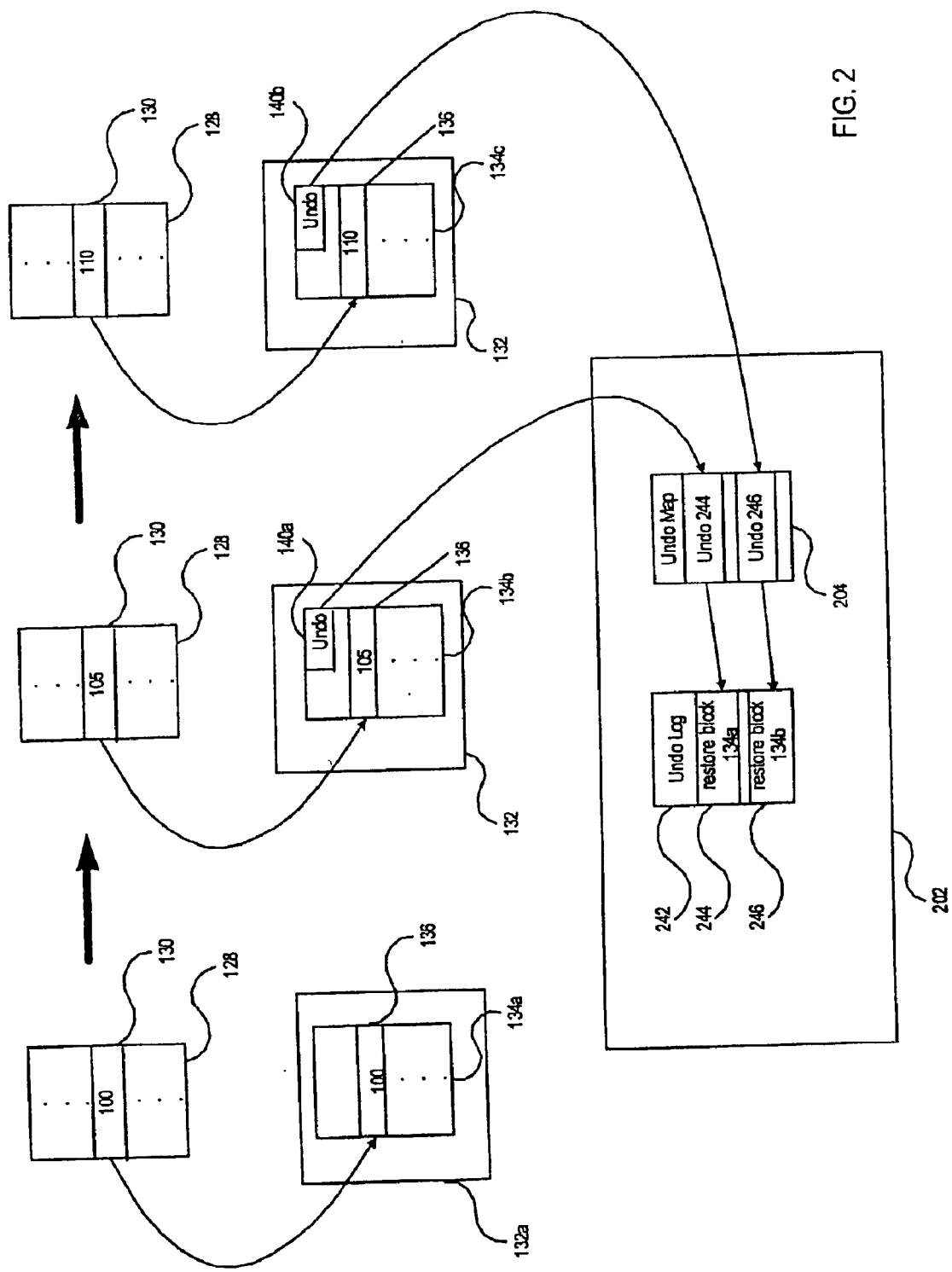
FIG. 2 shows an alternate structure for implementing undo records according to an embodiment of the invention.

FIG. 2 illustrates an alternate approach for implementing in-memory undo records according to an embodiment of the invention. Like the illustrative example of FIG. 1, a table 128 includes a row 130 that includes a data value that is first changed from "100" to "105", and then is changed from "105" to "110". In addition, the data value change from "100" to "105" results in a modification of the corresponding data block from the state shown in 134a to 134b. The data value change from "105" to "110" results in a modification of the corresponding data block from the state shown in 134b to 134c.

However, in FIG. 2, the undo log 242 is maintained in memory 202. In an embodiment, memory 202 comprises a shared memory region that is accessible by other transactions and processes in the database system. Memory 202 may also comprise a dedicated memory space that is only modifiable by its assigned transaction or process. When a new undo record is needed, space is allocated from memory 202 to hold the new undo record.

Undo log 242 in memory 202 includes a first undo information 244 that contains change vectors to restore the database block to its state shown in 134a from the state shown in 134b. Undo log 242 in memory 202 includes a second undo information 246 that contains change vectors to restore the database block to its state shown in 134b from the state shown in 134c.

In the version of the database block shown in 134b, the undo referencing structure 140a is interpreted to point to the in-memory undo records instead of on-disk undo records. If the undo referencing structures 140a and 140b in versions of the database block 134b and 134c, respectively, are utilized such that they point to on-disk locations, then an undo mapping structure 204 can be created to map the undo references in the blocks to the undo record addresses in memory. Thus, the undo mapping structure 204 can be configured to map an on-disk offset/address that is included in a database block to the in-memory offset/address for the specific undo record corresponding to the most recent changes to that block. In the event of a log flush that writes undo records to disk, this type of approach allows the reference to undo records in the database blocks to correctly reference the location of the relevant undo records. Moreover, this approach allows in-memory undo information to be compatible with database systems that employ on-disk undo records in addition to in-memory undo records. In this way, both in-memory and on-disk undo records can be concurrently used in the system, since undo records stored on-disk are directly referenced while undo records stored in-memory are indirectly referenced through the undo mapping structure 204.

The undo referencing structures in the database blocks may alternatively be configured to directly point, reference, or link to the specific undo record in memory 202 that corresponds to the latest change for that block. In this alternate approach, the mapping structure 204 is not needed to interpret the offset/address that is recorded in the database blocks, since the referencing structures 140*a* and 140*b* directly contain an in-memory address.

Figure 3:
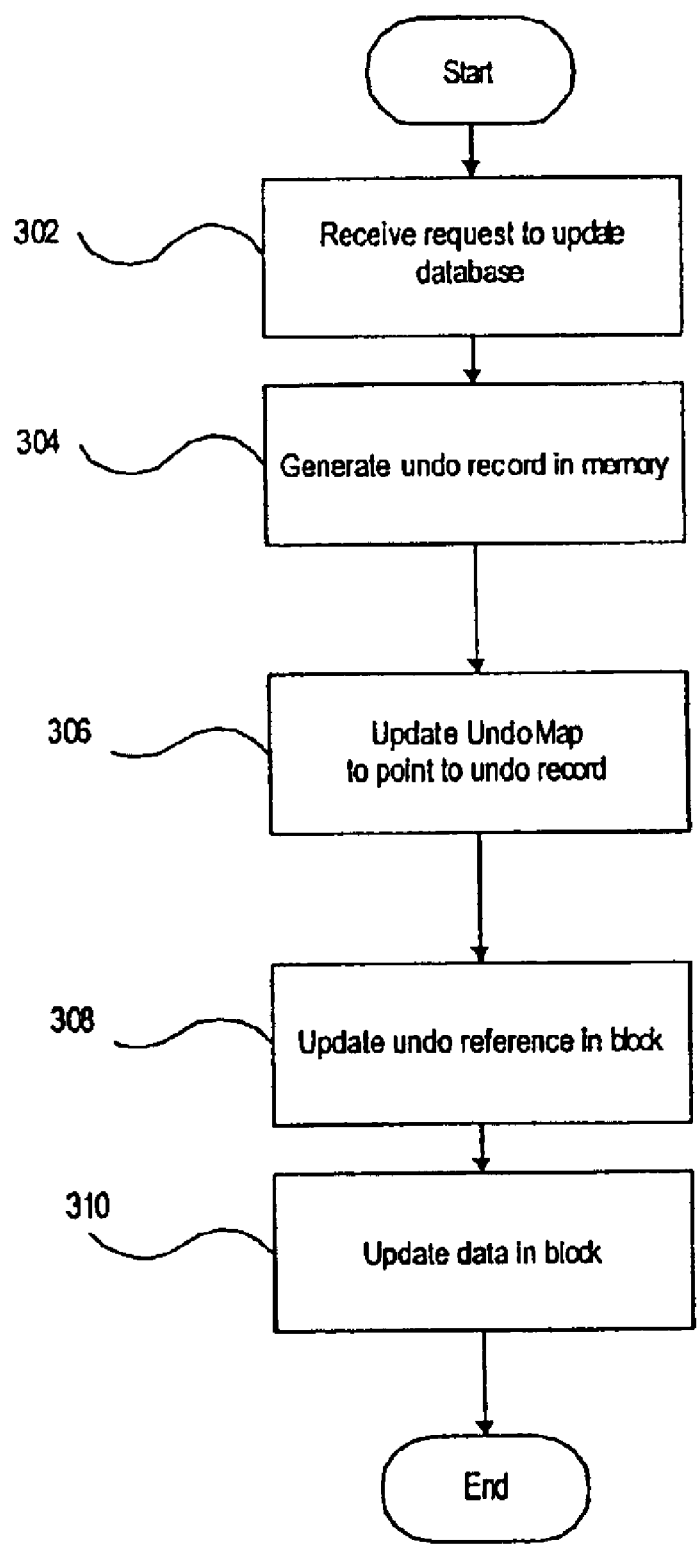
FIG. 3 shows a flowchart of an embodiment of a process for implementing undo records.

FIG. 3 shows a flowchart of an embodiment of the invention for implementing in-memory undo records. At 302, a request is received to update the database. The request is analyzed to determine the particular change that would be effected to the database and identification is made of the particular block that would be affected. At 304, the undo record is formed and generated in memory. The undo record contains sufficient information to roll back the effects of the planned change to the data block. As stated above, in an embodiment, the space for the new undo record is allocated from a shared memory region in memory. At 306, an undo mapping structure is updated to map the location of the undo record in memory to the referenced location for the undo record that is to be stored in the block. If the system is configured to allow database blocks to directly reference in-memory undo locations, then step 306 is skipped. At 308, the database block is updated to include a reference to the undo record. At 310, the relevant data portion of the database block is updated with the requested change.

In an embodiment, uncommitted changes in the database are not persisted to disk. In this way, in-memory undo records may not need to be stored to disk. This is because if there are no uncommitted changes that are restored from disk after a recovery operation, then there would not be any uncommitted changes to be rolled back, which would therefore not require the undo records to be persisted to disk. One example approach for ensuring that uncommitted changes are not persisted to disk is to employ the batch-processed redo procedure described further below.

In one embodiment of the invention, undo records are maintained in memory for defined periods of time before being de-allocated from memory. This allows storage space for unneeded undo records to be recycled and used for new undo records. If the undo retention period is set too long, then storage space is wasted to store too many unneeded undo records. However, if the undo retention period is set too short, then critical undo records may be recycled even though they may still be needed to roll back changes in the database system, e.g., for recovery or to restore an earlier version of the database.

Consider this aspect with reference to multi-versioning database systems. In a multi-versioning database system, a transaction in the system can access a "snapshot" of the database as of a particular point in time. A snapshot is an accessible view of the database. The term "time" may or may not be used in a temporal sense, and may even refer to a system commit time value that increments upon commits performed in the system rather than the temporal passage of time.

For such multi-versioning systems, in an embodiment, undo records are maintained such that the database can be rolled back consistent with the time period required by the longest-running pending transaction in the system. In this approach, each undo records may be associated with a system timestamp so that the undo records can be correlated with desired points in time for the transaction snapshot.

For example, consider a long-running transaction that began processing when the system time was t1. While the transaction was performing its operations, the system time has moved onto t3. The database at time t1 is different than the database at time t3. To improve concurrency in the database system, the system may still allow the long-running transaction to continue to access snapshots from time t1, since this minimizes the amount of data locking in the system, so long as inappropriate data conflicts are not created. To recreate the database as of time t1, undo records are applied to the current state of the database at time t3 until the correct state of the database is achieved for time t1. However, this means that undo records that can roll the database back to a state consistent with time t1 should be preserved until the long-running transaction has completed its processing. Thus, in one embodiment, the in-memory undo records are maintained until no longer needed by the earliest running pending transaction in the system.

In an alternate embodiment, an arbitrary point in time can be chosen as the cut-off point for retaining undo records. For example, it may be decided that only 5 minutes of undo records are to be maintained, since any greater amount of time results in excessive consumption of memory space for undo records. In this example, any transaction that extends beyond the five-minute limit may not be able to access undo records going far back enough in time to create an appropriate snapshot needed for processing. In either approach, undo records can always be flushed to disk if the memory space becomes excessively filled.

The present embodiment also provides a more efficient storage procedure for maintaining undo information. In particular, the undo information is directly stored in a portion of a memory pool that is dedicated to storing undo information. This is in contrast to an approach for implementing undo records in which the undo information is first generated onto a local stack or a buffer cache, then copied to an in-memory representation of an on-disk block structure, which is then written to the corresponding block on disk. By directly writing the undo information to the dedicated memory pool, excessive memory and disk copying can be avoided. Moreover, by not storing the undo information in an on-disk representation, certain efficiencies can be obtained. For example, the undo information can be maintained in its native form in memory, e.g., including structures such as pointers, linked lists, etc., that may not be represented in an on-disk structure for the undo records, which may need to be contiguous/linearized and stripped of such pointers and linked lists.

Under certain circumstances, in-memory undo information may be written to disk. For example, this may occur if the dedicated memory buffer becomes completely full and no further undo information can be written into memory unless older or less-used undo information are written to disk. If the in-memory undo information must be written to disk, then in a first embodiment, the in-memory native form of the undo information is converted to the on-disk format before being written to disk. Alternatively, the in-memory native form of the undo information can be written "as-is" to disk, and when it is read back into memory, can be re-parsed to reconstruct in-memory structures such as pointers and linked lists.

Batch Processing Redo

An embodiment of the present invention provides an improved method and system for implementing redo records in a database system. Recall that redo records are used in a database system to create and/or restore changes that were previously made to data in the database. In many database systems, redo logging is configured such that redo records for a given change must be made persistent before the change can be committed or actually made to the data. With write-ahead logging, the redo records are written even before a given change is applied to a disk block. In effect, the redo log becomes the true mirror of the actual state of a database system, with the stored on-disk version of the database possibly inconsistent with the more recent changes to the database that is only reflected in-memory or in the redo logs. Since the in-memory version of the database may be lost upon a system failure, only the redo log may contain the accurate state of the database.

In an embodiment, redo records are not immediately written to disk when a change is made to a disk block. Instead, the redo records are retained in memory, and are batched persisted to disk only upon a commit. The batched processing of redo records can be used in conjunction with, or separate from, the in-memory processing of undo records described above. Using this approach, the act of updating or changing the data in the database can be separated from the act of generating a redo log record, which is significantly different from prior concepts of write-ahead logging.

Figure 4:
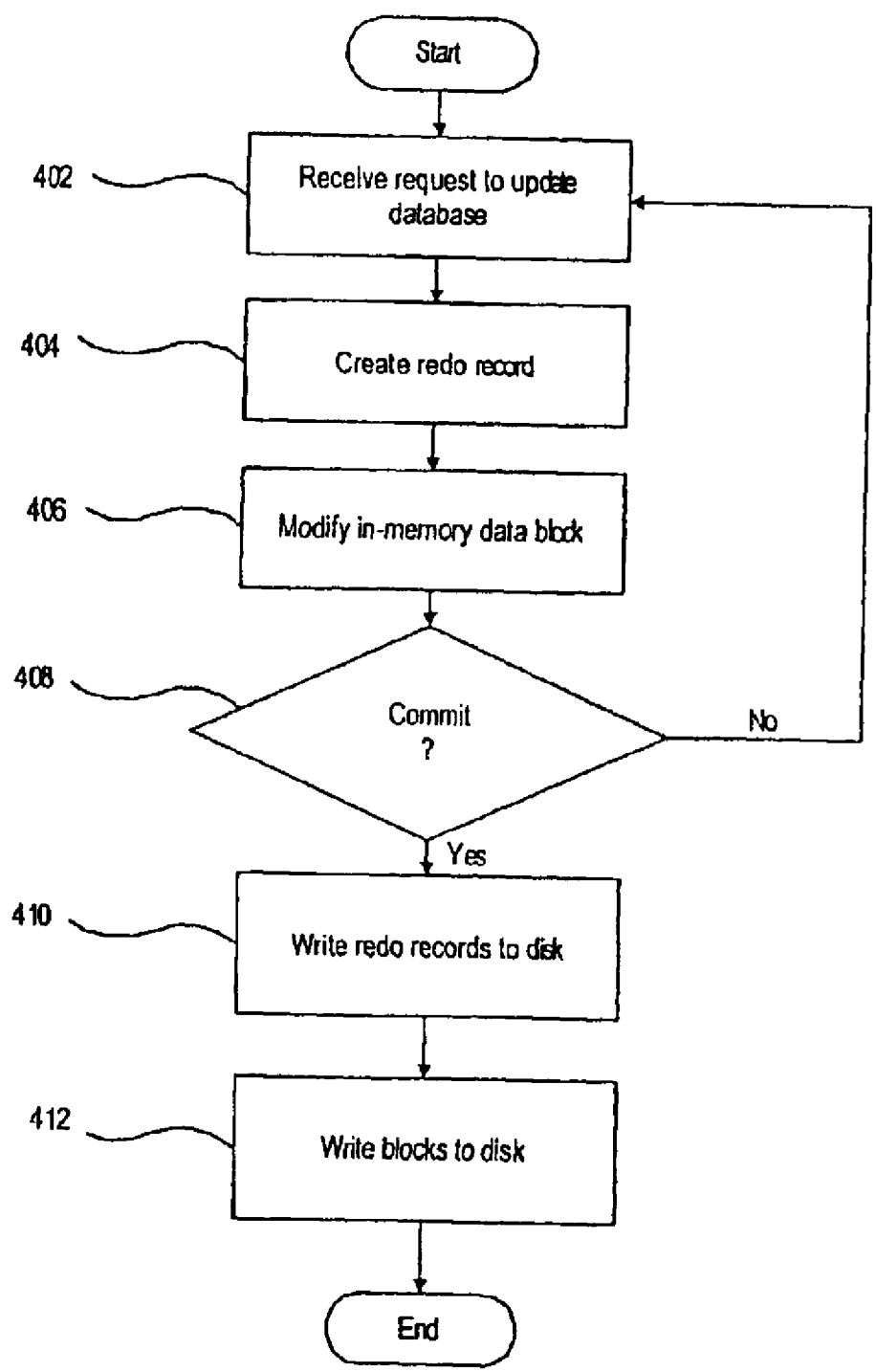
FIG. 4 shows a flowchart of an embodiment of a process for implementing redo records.

FIG. 4 shows a flowchart of an embodiment of the invention for performing batched processing of redo records in a database system. At 402, a request is received to make a change to the database. The request is analyzed to determine the particular change that would be effected to the database and identification is made of the particular block that would be affected. At 404, the redo information is formed and generated in memory. At this point, the redo information is not yet being written to disk. In an embodiment, the redo information is created in a private section of a shared memory region. The shared memory region is accessible by other transactions and processes in the system. However, the private section is initially locked by the particular transaction that is making the present change. By doing so, only the present transaction is allowed to create new redo information in the private section. This reduces contention for space and increases efficiency by reducing the need to repeatedly take new locks as new redo information are generated by a transaction. However, as explained in more detail below, under certain circumstances, other transactions and processes are permitted greater access to this private region in the shared memory pool.

At 406, the in-memory representation of the relevant data block is modified based upon the requested change. A determination is made whether a commit can be performed, or whether there are additional actions that must be taken by the transaction (408). If additional actions must be taken, then the process returns back to 402 to continue processing.

If a commit is desired, then the collected in-memory redo information for the entire transaction is written to disk as a single operation (410). At 412, the on-disk database block is itself written to be consistent with the changes made to the in-memory representation of that block.

Figure 5:
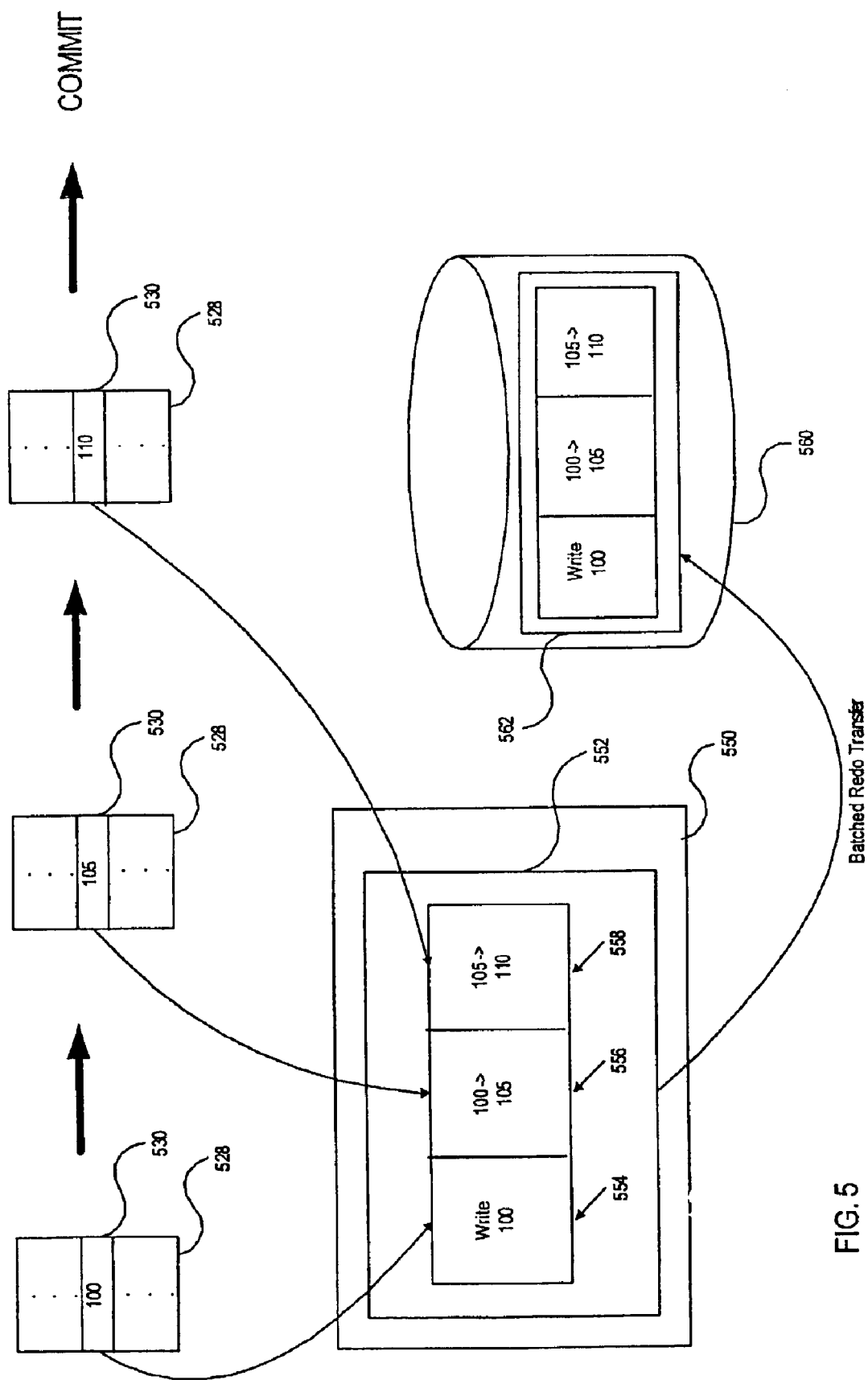
FIG. 5 shows an alternate structure for implementing redo records according to an embodiment of the invention.

FIG. 5 illustratively shows an example of batch processed redo information according to an embodiment of the invention. FIG. 5 shows a database table 528 that includes a row 530. Consider a transaction that performs a first operation by writing the data value "100" to row 530. Consistent with this desired operation, redo information 554 is created in a private section 552 of shared memory 550. Private section 552 of shared memory 550 has been specially allocated and locked for the present transaction. The redo information 554 contains a change vector that describes the steps necessary to recreate the desired change to the database block corresponding to row 530 in table 528 (database block is not shown in FIG. 5). The in-memory representation of the relevant database block may be updated at this point consistent with the desired data value for row 530. At this point, redo information 554 is maintained in memory, and is not yet written to the on-disk redo log 562 on disk 560.

The transaction performs an update to row 530, by placing the data value "105" into that row. This update operation causes another redo information 556 to be created in the private section 552 of shared memory 550. The redo information 556 contains a change vector that describes the steps necessary to recreate the desired change to the database block corresponding to updating row 530 in table 528 from the data value "100" to "105". The in-memory representation of the relevant database block may be updated at this point consistent with the desired data value for row 530. At this point, redo information 556 is also maintained in memory, and is not yet written to the on-disk redo log 562 on disk 560.

The transaction performs another update to row 530, by placing the data value "110" into that row. This update operation causes another redo information 558 to be created in the private section 552 of shared memory 550. The redo information 558 contains a change vector that describes the steps necessary to recreate the desired change to the database block corresponding to updating row 530 in table 528 from the data value "105" to "110". The in-memory representation of the relevant database block may be updated at this point consistent with the desired data value for row 530. At this point, redo information 558 is also maintained in memory, and is not yet written to the on-disk redo log 562 on disk 560.

After this latest change to table 530, the transaction commits. At this point, the entire set of redo information 554, 556, and 558 for the transaction are batch processed by writing all these information items, in a single operation, to the on-disk redo log 562 on disk 560.

A benefit of this approach is that it significantly reduces the costs for writing redo information to disk, since the entire set of redo information items can be written as a large block or as a single record, rather than requiring separate I/O operations for writing individual redo records. Moreover, the scalability of the system can be improved since redo records are not being processed individually, reducing the possibility of creating a bottleneck by separately processing the redo records.

In addition, this approach can improve commit time latency, even over other approaches that maintain large numbers of redo records in memory, since less contention for accessing individual redo records to write to disk is incurred when the entire group of redo records can be processed as a group. This avoids the serialization problems that may occur if multiple different entities are possibly vying at the same time to write redo records to disk.

Another advantage of performing batched redo processing is that redo records and their associated changes to the database are not persisted to disk until commit time. As a result, if a failure occurs in the middle of a transaction and recovery from disk is performed, then only committed changes are restored to the database. Since uncommitted changes are not persisted to disk, they are not restored along with the rest of the database. This avoids the need to roll back the database for recovery, which avoids the need to maintain undo records on disk.

In an embodiment, the data blocks that are being accessed by a first transaction are exclusively locked until the first transaction commits. In this way, a second transaction is not permitted to access intermediate changes that are made by the first transaction. This may be desired to prevent the intermediate changes by the first transaction from creating dependencies relied upon by the second transaction. To illustrate the possible problem if this is not performed, consider if the first transaction is batch processing its redo information but its intermediate changes are visible and depended upon by the second transaction. If the first transaction aborts, then roll-back operations may remove those intermediate changes as well as not having the redo records for these intermediate changes persistently stored. If this happens, then the second transaction that depended upon those intermediate changes may be in an inconsistent state with respect to the rest of the database. This is because the state of the database relied upon by the second transaction, i.e., showing intermediate changes by the first transaction, is not accurately reflected in the persisted state of the database nor in the persisted redo log.

Thus, one approach for preventing cross-dependencies is to pin the data blocks accessed by the first transaction until the first transaction has committed, or aborted its operations and rolled back any changes. With this approach, higher efficiency processing is gained if different transactions process disjoint sets of data.

Consider if the second transaction must access a data block that is being locked by the first transaction. This may occur, for example, if the first transaction has performed structural changes to the database, e.g., creating a new database block to store a portion of a table. In one embodiment, this situation is handled by allowing the second transaction to generate changes on behalf of the first transaction. Since the first transaction has created its redo records in a shared memory pool, those redo records are accessible to the second transaction. The second transaction can flush the relevant redo records for changes it depends upon to the general redo log that is persisted, whether in-memory or on-disk. Alternatively, all previously-created redo records by the first transaction can be flushed at that point. Once the redo records for those depended-upon changes have been flushed, the second transaction can continue its processing without fear of data inconsistencies if the first transaction fails to commit. By allowing the second transaction to effectively perform work on behalf of the first transaction, e.g., by writing or flushing blocking or non-blocking redo records, this additionally prevents deadlocks from occurring in the system.

In an embodiment, the second transaction can downgrade the first transaction such that it no longer performs batch processing of redo records. Instead, all further changes made by the first transaction result in conventional redo records that are immediately made persistent. The existing redo records in the private section of the shared pool can be immediately flushed. This can occur by copying the records into non-private space, or by re-designating the private space to be non-private space.

Alternatively, the first transaction can continue performing batch processing of redo records, with the caveat that previously stored redo records in the private section of the shared memory has been flushed out of that private section. However, new redo records can continue to be created and temporarily stored in the private section of shared memory that has been designated for the first transaction.

A significant advantage of the present embodiment is that batched redo record can be optimized either during or before being written to disk. For example, referring back to FIG. 5, it can be seen that three separate redo information items 554, 556, and 558 were created by the transaction to reflect changing the data value in row 530 first to "100", then to "105", and finally to "110" before the transaction commits. An optimization that can be performed if the set of redo information items is processed as a group is to collapse the set of redo information to only reflect the final state of the data block. Thus, instead of writing all three redo information items 554, 556, and 558 to disk, collapsing the redo record results in a single redo record in the on-disk redo log 562 that includes a change vector associated with writing the final data value "110" to row 530 in table 528.

As noted above, the act of performing changes to data in the database (e.g., to the database blocks) can be separated from the act of generating redo records. The application of redo to blocks in the cache (and possibly making them private) enables the system to provide standard transactional semantics—to query changes within a transaction and make multiple changes to the same data within a transaction. Also noted above, one aspect of applying changes to block and not immediately writing redo is to not allow such a block to be persisted to disk until the "batched" redo is first written out, which provides compatibility with "write ahead logging" principles.

Zero Copy Log Records

According to an embodiment of the invention, transaction logs can be written in-memory in a format consistent on-disk log formats. This is in contrast to approaches that creates an intermediate format for redo and undo records, which needs to be reformatted before begin written to disk. By initially generating the in-memory log record in the final format, greater efficiencies can be achieved since no further time, resource, or memory space are needed to convert the intermediate format of the log records into final formats.

In addition, the process that creates the log records can itself write the redo or undo records to disk. This is in contrast to using a dedicated log writer process to write transaction log records to disk.

System Architecture Overview

Figure 6:
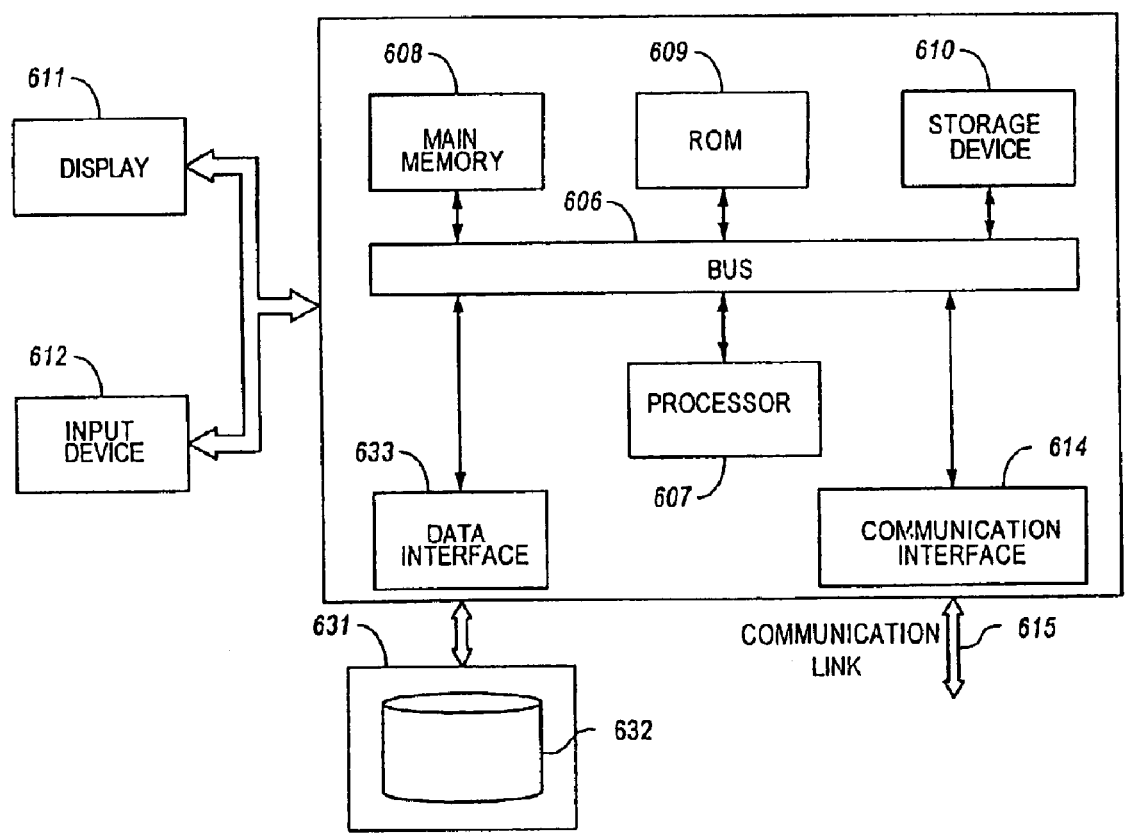
FIG. 6 is a diagram of a computer system with which the present invention can be implemented.

The execution of the sequences of instructions required to practice the invention may be performed in embodiments of the invention by a computer system 1400 as shown in FIG. 6. In an embodiment of the invention, execution of the sequences of instructions required to practice the invention is performed by a single computer system 1400. According to other embodiments of the invention, two or more computer systems 1400 coupled by a communication link 1415 may perform the sequence of instructions required to practice the invention in coordination with one another. In order to avoid needlessly obscuring the invention, a description of only one computer system 1400 will be presented below; however, it should be understood that any number of computer systems 1400 may be employed to practice the invention.

A computer system 1400 according to an embodiment of the invention will now be described with reference to FIG. 6, which is a block diagram of the functional components of a computer system 1400 according to an embodiment of the invention. As used herein, the term computer system 1400 is broadly used to describe any computing device that can store and independently run one or more programs.

Each computer system 1400 may include a communication interface 1414 coupled to the bus 1406. The communication interface 1414 provides two-way communication between computer systems 1400. The communication interface 1414 of a respective computer system 1400 transmits and receives electrical, electromagnetic or optical signals, that include data streams representing various types of signal information, e.g., instructions, messages and data. A communication link 1415 links one computer system 1400 with another computer system 1400. For example, the communication link 1415 may be a LAN, in which case the communication interface 1414 may be a LAN card, or the communication link 1415 may be a PSTN, in which case the communication interface 1414 may be an integrated services digital network (ISDN) card or a modem.

A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals, that include data streams representing various types of signal information, e.g., instructions, messages and data. In embodiments of the invention, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407.

The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407.

A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment of the invention, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 1407. Such a medium may take many forms, including, but not limited to, non-volatile, volatile and transmission media. Non-volatile media, i.e., media that can retain information in the absence of power, includes the ROM 1409, CD ROM, magnetic tape, and magnetic discs. Volatile media, i.e., media that cannot retain information in the absence of power, includes the main memory 1408. Transmission media includes coaxial cables, copper wire and fiber optics, including the wires that comprise the bus 1406. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

What is claimed is:

1. A method for implementing redo records in a database system, comprising:

receiving a request to process a first transaction, the first transaction comprising one or more updates to a database;

forming a set of redo information corresponding to the one or more updates to the database by the first transaction, the set of redo information comprising one or more redo information items;

generating the set of redo information in memory, wherein the one or more redo information items are not individually persisted; and upon a commit of the first transaction, batch persisting the set of redo information as a group.

2. The method of claim 1 in which the memory comprises shared memory.

3. The method of claim 2 in which the set of redo information is stored in a private region of the shared memory.

4. The method of claim 1 in which the one or more redo information items are created in a final format instead of an intermediate format.

5. The method of claim 1 in which the set of data acted upon by the first transaction is exclusively locked.

6. The method of claim 5 in which second transaction acts upon the set of data updated by the first transaction.

7. The method of claim 6 in which selected ones of the one or more redo information items for which dependency exists for the second transaction are removed from batch processing.

8. The method of claim 6 in which all of the one or more redo information items are removed from batch processing.

9. The method of claim 6 in which the first transaction is downgraded such that it no longer continue batch processing redo information.

10. The method of claim 6 in which the first transaction continues to batch process redo information.

11. The method of claim 1 in which the set of redo information is optimized before being persisted.

12. The method of claim 11 in which the set of redo information is optimized by collapsing redo information items to remove intermediate changes to data items.

13. The method of claim 1 in which the set of redo information is batch persisted by writing to a redo log on disk.

14. The method of claim 1 in which the set of one or more redo information items is persisted as a single redo record.

15. The method of claim 1 in which undo information is not persisted.

16. The method of claim 1 in which the act of processing an update to the database is separated from the act of generating redo information.

17. The method of claim 1 in which the one or more updates are not persisted until the set of redo information is persisted.

18. A computer program product comprising a computer usable medium having executable code to execute a process for implementing redo records in a database system, the process comprising:

receiving a request to process a first transaction, the first transaction comprising one or more updates to a database;

forming a set of redo information corresponding to the one or more updates to the database by the first transaction, the set of redo information comprising one or more redo information items;

generating the set of redo information in memory, wherein the one or more redo information items are not individually persisted; and upon a commit of the first transaction, batch persisting the set of redo information as a group.

19. The computer program product of claim 18 in which the memory comprises shared memory.

20. The computer program product of claim 19 in which the set of redo information is stored in a private region of the shared memory.

21. The computer program product of claim 18 in which the one or more redo information items are created in a final format instead of an intermediate format.

22. The computer program product of claim 18 in which the set of data acted upon by the first transaction is exclusively locked.

23. The computer program product of claim 22 in which second transaction acts upon the set of data updated by the first transaction.

24. The computer program product of claim 23 in which selected ones of the one or more redo information items for which dependency exists for the second transaction are removed from batch processing.

25. The computer program product of claim 23 in which all of the one or more redo information items are removed from batch processing.

26. The computer program product of claim 23 in which the first transactioin is downgraded such that it no longer continue batch processing redo information.

27. The computer program product of claim 23 in which the first transaction continues to batch process redo information.

28. The computer program product of claim 18 in which the set of redo information is optimized before being persisted.

29. The computer program product of claim 28 in which the set of redo information is optimized by collapsing redo information items to remove intermediate changes to data items.

30. The computer program product of claim 18 in which the set of redo information is batch persisted by writing to a redo log on disk.

31. The computer program product of claim 18 which the set of one or more redo information items is persisted as a single redo record.

32. The computer program product of claim 18 in which undo information is not persisted.

33. The computer program product of claim 18 in which the act of processing an update to the database is separated from the act of generating redo information.

34. The computer program product of claim 18 in which the one or more updates are not persisted until the set of redo information is persisted.

35. A system for implementing redo records in a database system, comprising:

means for receiving a request to process a first transaction, the first transaction comprising one or more updates to a database;

means for forming a set of redo information corresponding to the one or more updates to the database by the first transaction, the set of redo information comprising one or more redo information items;

means for generating the set of redo records in memory, wherein the one or more redo records are not individually persisted; and means for impolementing, upon a commit of the first transaction, batch persisting the set of redo information as a group.

36. The system of claim 35 in which the memory comprises shared memory.

37. The system of claim 36 in which the set of redo information is stored in a privated region of the shared memory.

38. The system of claim 35 in which the one or more redo information items are created in a final format instead of an intermediate format.

39. The system of claim 35 in which the set of data acted upon by the first transaction is exclusively locked.

40. The system of claim 39 in which second transaction acts upon the set data updated by the first transaction.

41. The system of claim 40 in which selected ones of the one or more redo information items for which dependency exists for the second transaction are removed from batch processing.

42. The system of claim 40 in which all of the one or more redo information items are removed from batch processing.

43. The system of claim 40 in which the first transaction is downgraded such that it no longer continue batch processing redo information.

44. The system of claim 40 in which the first transaction continues to batch process redo information.

45. The system of claim 35 in which the set of redo information is optimized before being persisted.

46. The system of claim 45 in which the set of redo information is optimized by collapsing redo information items to remove intermediate changes to data items.

47. The system of claim 35 in which the set of redo information is batch persisted by writing to a redo log on disk.

48. The system of claim 35 in which the set of one or more redo information items is persisted as a single redo record.

49. The system of claim 35 in which undo information is not persisted.

* * * * *

UNITED STATES PATENT AND TRADEMARK OFFICE
CERTIFICATE OF CORRECTION

PATENT NO. : 6,976,022 B2
APPLICATION NO. : 10/245118
DATED : December 13, 2005
INVENTOR(S) : Srinivas Vemuri et al.

It is certified that error appears in the above-identified patent and that said Letters Patent is hereby corrected as shown below:

Claim 18, Col. 13, line 17, replace "a computer usable" with

--a tangible computer-readable--.

Claim 31, Col. 14, line 4, immediately after "18", insert --in--.

Claim 37, Col. 14, line 33, replace "privated" with --private--.

Signed and Sealed this

Eleventh Day of July, 2006

JON W. DUDAS
*Director of the United States Patent and Trademark Office*